No. 896,365.  
PATENTED AUG. 18, 1908.

A. ERNST.  
GAS CLEANER.  
APPLICATION FILED FEB. 14, 1908.

2 SHEETS—SHEET 1.

Witnesses  
E. Van Landt  
E. P. La Gay

Alfred Ernst Inventor  
By his Attorneys Binney & Ogden

UNITED STATES PATENT OFFICE.

ALFRED ERNST, OF PITTSBURG, PENNSYLVANIA, ASSIGNOR TO THE COAL AND COKE BY-PRODUCTS COMPANY, A CORPORATION OF WEST VIRGINIA.

GAS-CLEANER.

No. 896,365.   Specification of Letters Patent.   Patented Aug. 18, 1908.

Application filed February 14, 1908. Serial No. 415,847.

*To all whom it may concern:*

Be it known that I, ALFRED ERNST, a citizen of the United States, and a resident of Pittsburg, in the State of Pennsylvania, have invented certain new and useful Improvements in Gas-Cleaners, of which the following is a specification.

The invention relates to means for cleaning and purifying the gases by extracting by-products and impurities from the gas.

The object of the invention is to produce a simple and effective gas cleaning apparatus.

The invention may be used with many kinds of gas, and I have selected for illustration a machine embodying the invention and particularly designed for washing and purifying the gases liberated in by-product coke ovens, and for extracting the by-products, such as ammonia and tar.

The process or method described, being a divisible invention and independent of the particular apparatus, forms the subject-matter of my co-pending application No. 427,163, filed April 15, 1908.

Figure 1:
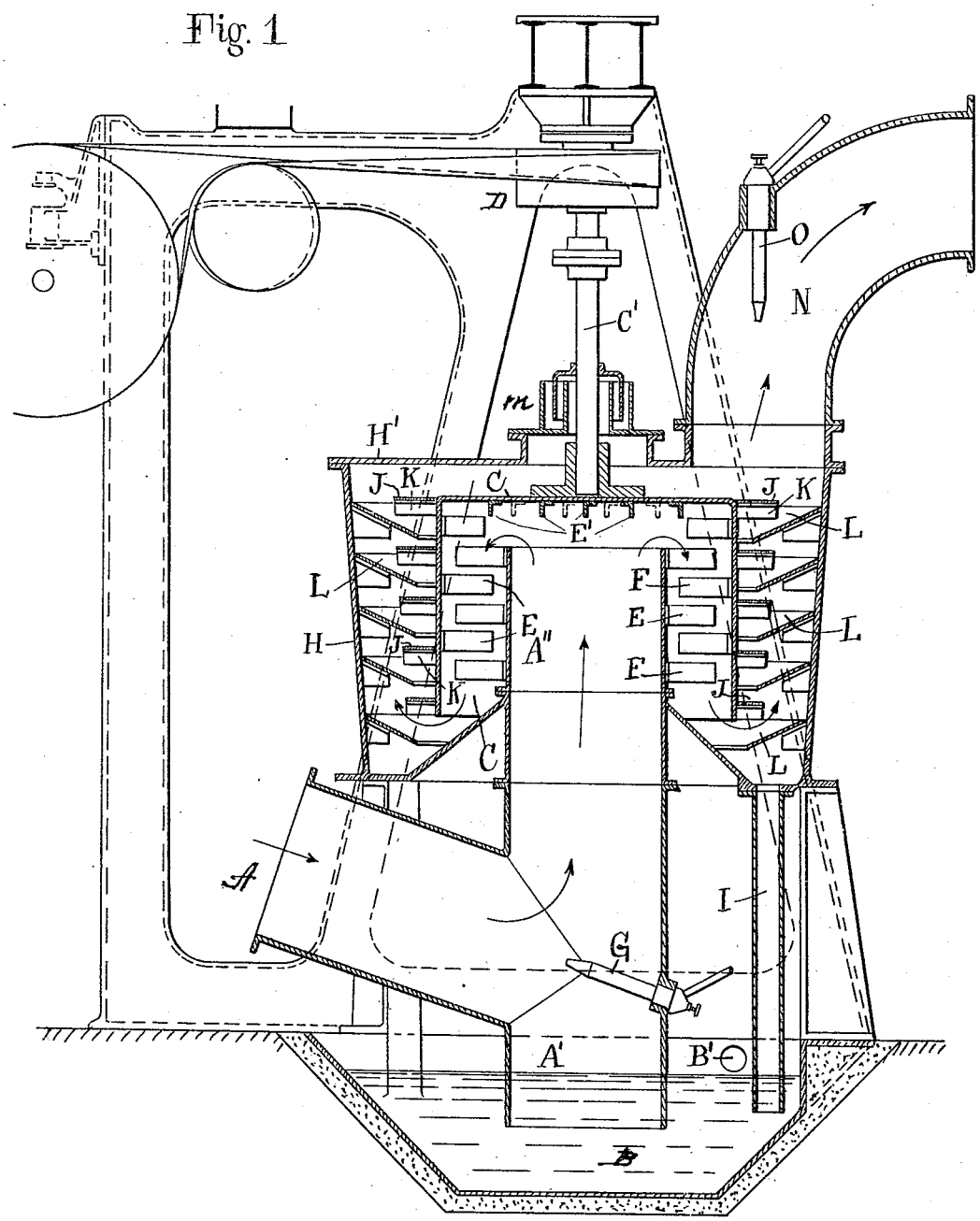
Figure 2:
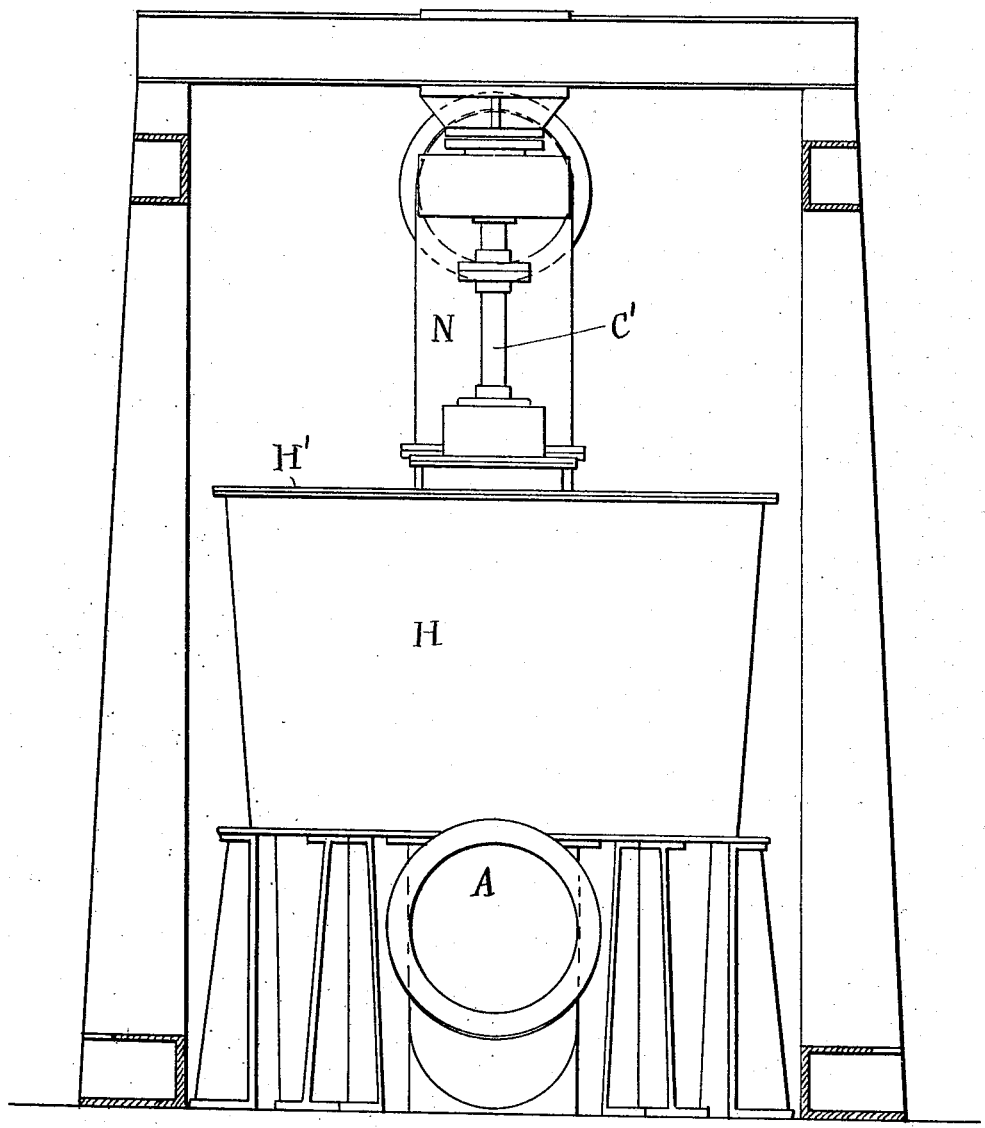

In the accompanying drawings: Figure 1 is a vertical sectional view; and Fig. 2 is a side elevation of the same, partly in section, seen from the left side of Fig. 1.

At A is the gas inlet, through which the coke oven gas is introduced into the machine after being partly cooled in the gas collecting mains on top of the ovens and the conducting pipes leading to this machine. The inlet A slants downward and has two continuations, one downward at A' and water-sealed in the water space B, and the other one, A'', extending upwards. The water space B collects the ammonia water and the other products that are extracted in the machine. An overflow B' is provided at a suitable height. The gas entering the inlet A is met by a strong fine spray from the nozzle G. This spray, if of water, meeting the hot gas, will cause a very considerable evaporation of water and will also absorb a very considerable proportion of the ammonia and some of the other impurities present. The gas, with the evaporated water and finely divided spray, passes up the pipe A'' and issues therefrom into the inverted rotary cup C driven by shaft C' and pulley D, which is suitably driven at high speed.

The inverted cup C extends down a considerable distance around the pipe A'', so that the gas has to flow downwards around the pipe A'' before passing beneath the lower edge of the cup C. The inner wall of the cup C is provided with a series of inwardly projecting beaters or blades E which move with it; and the outer surface of the pipe A'' is provided with similar beaters or blades F between which the blades E pass with high velocity and in close proximity, as shown. Owing to the combined action of the beaters and centrifugal force, the gas is subjected to a very thorough mixing and beating action; and the dust and finely divided spray or liquids of any sort are thrown outwards against the inner surface of the cup C, down which they may pass to its lower edge and be thrown off, finally passing down through the pipe I into the water seal B. The lower surface of the upper end of the cup C is also provided with beaters or blades E', as shown, to aid in the action. The outer surface of the cup C is provided with a series of concentric annular shelves J which preferably are progressively longer from the lowest to the highest and which are provided at frequent intervals with depending blades or vanes K.

The outer casing H incloses the space around the cup C and extends from the tube A downwards and outwards and then upwards, flaring slightly instead of being parallel with the wall of the cup C. At the top H' of the casing it is provided with a water-seal M for the shaft C' and the gas outlet N. In the upper portion of the apparatus, and preferably in the gas outlet N, is located a second spray nozzle O which delivers a spray into the gas above the rotary cup C. This spray falls partly on the top of the cup C, partly on the shelf J, and partly onto the uppermost stationary shelf L. There are a series of these shelves secured on the inner wall of the casing H and preferably slanting inwards and downwards, as shown, and extending nearly to the wall of the cup C between the shelves J and vanes K. The water falling on the rapidly rotating cup C and uppermost shelf J is thrown off by the centrifugal action directly against the inner wall of the casing. Thence flowing downwards and inwards along the stationary shelf L, it drips onto the next shelf J, from which it is again thrown off in a fine spray against the casing. Again it flows downwards and inwards over the second shelf L onto the third shelf K, and so on through the series. In this way the gas flowing upwards around the cup C, is subjected to a violent beating and whirling action from the vanes K and is compelled to take a sinuous course around the successive shelves J and L and is intimately subjected to the water on the surface of the stationary shelves and in passing each of the shelves J is subjected to the fine spray thrown therefrom directly across the space through which the gas is passing. It will be seen that the gas as it passes outwards from the lower end of the cup C, passes upwards in this devious course to the gas outlet N, while the cleansing liquid from the spray O passes downwards in the opposite direction to the gas and finally escapes from the lowermost shelf L through the water-sealed pipe I, carrying with it the absorbed or collected impurities. The gas therefore meets the water in a fresher condition at each succeeding shelf as it passes toward the gas outlet, while the water passing downwards becomes richer and richer in impurities from the gas. I make no claim broadly, however, to the passing of gas and liquid in opposite directions for this purpose.

The other details of the apparatus will be readily understood, as applied, to those skilled in the art, without further description.

It will be seen that the gas is first subjected to a spray by which it takes up vapor, and if highly heated is considerably cooled by the spray. As a second step the gas is subjected to beating and centrifugal action as it passes downward to the lower edge of the cup C, and then passing upward between the shelves J and L it is subjected intimately to the wet surfaces. It is subjected to the centrifugal action and to the spraying action on the outer side of the cup C and to the flowing water on the shelf L, the water flowing downward and the gas upward. Lastly, it is subjected to the spray O. As the gas thus cleaned passes from the apparatus with an excess of moisture, I prefer to pass it through a second apparatus substantially like that described, with the exception of the water sprays. In this second apparatus any condensed vapor or free moisture will be thrown out by the action of the apparatus, carrying with it the absorbed ammonia, and whatever other impurities it contains will drain down into the water seal beneath the apparatus.

In place of the water spray at G I may introduce steam or part steam and water, according to the condition and qualities of the gas to be washed, the choice, as will be understood, depending largely on the composition and temperature of the gases. I desire also to include as equivalents other liquids used in place of the water.

I claim the following:

1. Apparatus for carrying out the action described and combining means for spraying the gas, a passageway for conducting the gas and subjecting it to such spraying, means for conducting the gas therefrom, means through which the gas flows downwardly for beating the gas and simultaneously subjecting it to centrifugal force, and further means through which the gas flows upwardly for beating it and subjecting it to centrifugal force co-acting with means for supplying additional water during its passage through the last said means, substantially as set forth.

2. Apparatus for cleaning gas, combining a water spray device, a gas inlet for conducting gas thereto, a water-sealed drip connection therefrom, a horizontally revoluble centrifugal device carrying external and internal beaters or blades, means for conducting the gas successively to the internal and external beaters or blades, and a series of stationary shelves in coöperative relation with the exterior beaters, and means for delivering water to the said shelves in a direction opposite to the flow of the gas past the said shelves.

3. Apparatus for cleaning gas, combining a water spray device, a gas inlet for conducting gas thereto, a water-sealed drip connection therefrom, a horizontally revoluble centrifugal device carrying external and internal beaters or blades, means for conducting the gas successively to the internal and external beaters or blades, a series of stationary shelves in coöperative relation with the exterior beaters, and means for delivering water to the said shelves in a direction opposite to the flow of the gas past the said shelves, said means consisting of a water spraying device.

4. In combination in a gas cleaning device, a water spray device, a gas inlet for conducting gas thereto, a passage way for conducting the gas therefrom provided with outwardly extending blades, a casing having inward and downward inclined shelves, a rotary centrifugal device having outwardly extending shelves for co-acting with the inclined shelves, said shelves being so placed that liquid will pass from shelf to shelf successively, means for introducing liquid therefor, said centrifugal device also having inwardly extending blades coacting with the blades on the passage way and means for passing gas between the said sets of shelves.

5. In combination in a gas cleaning device, a water spray device, a gas inlet for conducting gas thereto, a passage way for conducting the gas therefrom provided with outwardly extending blades, a casing having inward and downward inclined shelves, a rotary centrifugal device having outwardly extending shelves for co-acting with the inclined shelves, said shelves being so placed that liquid will pass from shelf to shelf successively, means for introducing liquid therefor, said centrifugal device also having inwardly extending blades coöperating with the blades on the passage way, means for passing gas between the passage way and the centrifugal device, and means for passing the gas between the said centrifugal device and the said casing in an opposite direction to the flow of the water.

6. A gas cleaning apparatus combining rotary and stationary members forming passage ways for the gas between them, shelves upon both sides of the rotary member extending toward shelves on the other members and deflecting the gas current from one to the other, the shelves of the stationary member being set to drip onto the shelves of the rotary member, and means for supplying water for the shelves.

7. In combination in gas cleaning apparatus, a rotating member having a vertical axis and externally projecting shelves on both sides of the same, a series of coöperating shelves extending between both sets of the first said shelves and extending in position to drip onto them, casings supporting the said coacting shelves and forming conducting walls for the gas, means for supplying water to the sets of shelves outside of the rotating member, all of said shelves coöperating to cause the gas to pass in a tortuous manner between the shelves while being acted upon by the rotary member and subjected to the spray delivered thereby between the outer sets of shelves.

8. In combination in a gas cleaner, a central gas passageway having connections for admitting the gas thereto, a rotary inverted cup having a vertical axis and surrounding the upper end of the said passageway, beater blades carried on the interior of the said cup, coöperating beater blades carried by the said passageway, a casing surrounding the said cup and receiving the gas delivered therefrom, external projections carried by the said cup and internal coöperating projections carried by the said casing, and means for supplying water to the said projections whereby the gas is brought into intimate contact with the water while being acted upon by the said projections.

9. In combination in a gas cleaner, a central gas passageway having connections for admitting the gas thereto, a rotary inverted cup having a vertical axis and surrounding the upper end of the said passageway, beater blades carried on the interior of the said cup, coöperating beater blades carried by the said passageway, a casing surrounding the said cup and receiving the gas delivered therefrom, a series of internal shelves on the said casing, a series of coöperating external shelves on the said cup and overlapped by the shelves on the casing, means for delivering water above the said shelves whereby the gas is subjected to water on the successive shelves carried by the casing and to spray thrown by the shelves carried by the said cup, and means for draining off and collecting the water.

10. Gas cleaning apparatus combining with a suitable casing a gas inlet, a gas outlet, a rotary gas beating member turning on a vertical axis and provided with outward projecting beater blades and outward projecting shelves, a plurality of inward projecting shelves for directing the gas toward the said beater blades, and a spray or jet device for the gas before it is subjected to the said beater blades and shelves.

11. Gas cleaning apparatus combining with a suitable casing a gas inlet, a gas outlet, a rotary gas beating member turning on a vertical axis and provided with outward projecting beater blades and outward projecting shelves, a plurality of inward projecting shelves for directing the gas toward the said beater blades, a spray or jet device for the gas before it is subjected to the said beater blades and shelves, and means for supplying water to the said shelves.

12. Gas cleaning apparatus combining with a suitable casing a gas inlet, a gas outlet, a rotary gas beating member turning on a vertical axis and provided with outward projecting beater blades and outward projecting shelves, a plurality of inward projecting shelves for directing the gas toward the said beater blades, a spray or jet device for the gas before it is subjected to the said beater blades and shelves, and means for initially beating the gas before it passes to the said shelves and beater blades.

In testimony whereof I have signed this specification in the presence of two subscribing witnesses, Feb'y 12, 1908.

ALFRED ERNST.

Witnesses:
SUE B. FRITZ,
ALICE A. TRILL.